United States Patent
Uchida (10) Patent No.: US 9,542,632 B2
(45) Date of Patent: Jan. 10, 2017

(54) IC CARD, PORTABLE ELECTRONIC DEVICE, AND READER/WRITER

(71) Applicant: Kabushiki Kaisha Toshiba, Tokyo (JP)

(72) Inventor: Keisuke Uchida, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/031,289

(22) Filed: Sep. 19, 2013

(65) Prior Publication Data

US 2014/0084063 A1 Mar. 27, 2014

(30) Foreign Application Priority Data

Sep. 21, 2012 (JP) .................................. 2012-207914

(51) Int. Cl.
*G06K 19/07* (2006.01)
*G06K 7/10* (2006.01)

(52) U.S. Cl.
CPC ....... *G06K 19/0723* (2013.01); *G06K 7/10009* (2013.01); *G06K 7/10237* (2013.01)

(58) Field of Classification Search
CPC ............ G06K 7/10009; G06K 19/0723; G06K 7/10237
See application file for complete search history.

(56) References Cited

U.S. PATENT DOCUMENTS 6,659,343 B2  12/2003  Tanaka
8,362,877 B2 *  1/2013  Bauchot ................. G08C 21/00
                                                  235/385
2005/0077356 A1  4/2005  Takayama et al.
2006/0131413 A1*  6/2006  Morita ................. G06K 7/0004
                                                  235/451
2010/0001843 A1  1/2010  Bae et al.
2012/0231735 A1*  9/2012  Takayama et al. .......... 455/41.1

(Continued)

FOREIGN PATENT DOCUMENTS

EP   2693369 A2   2/2014
FR   2957173 A1   9/2011

(Continued)

OTHER PUBLICATIONS

Extended European Search Report issued in related European Patent Application No. 13184939.0 mailed Mar. 11, 2014; 9 pages.

*Primary Examiner* — Sonji Johnson
(74) *Attorney, Agent, or Firm* — Baker Botts L.L.P.

(57) ABSTRACT

An IC card of an embodiment is provided with a receiver to receive a first command transmitted from an external device, a determining processor to determine whether or not the first command is a switching request command to request switching the IC card from a passive mode to an active mode, a switching processor to switch oneself from the passive mode to the active mode, when the first command is the switching request command, an identification information acquiring processor to acquire identification information of other IC card existing in a communicable range of the external device from the switching request command, a command generating processor to generate a second command which includes the identification information acquired by the identification information acquiring processor so as to make the other IC card execute processing, and a command transmitter to transmit the second command to the other IC card.

8 Claims, 7 Drawing Sheets

(56) References Cited

U.S. PATENT DOCUMENTS

2014/0034737 A1    2/2014  Sudou

FOREIGN PATENT DOCUMENTS

| JP | 2002024778 A | 1/2002 | | |
|---|---|---|---|---|
| JP | 20100160685 | 7/2010 | | |
| JP | 2011-118640 A | 6/2011 | | |
| WO | WO 2008121088 A1 * | 10/2008 | ............... | G07F 7/10 |

* cited by examiner

IC CARD, PORTABLE ELECTRONIC DEVICE, AND READER/WRITER

CROSS-REFERENCE TO RELATED APPLICATION

This application is based upon and claims the benefit of priority from the prior Japanese Patent Application No. 2012-207914, filed on Sep. 21, 2012, the entire contents of which are incorporated herein by reference.

FIELD

Embodiments of the present invention relate to an IC card, a portable electronic device, and a reader/writer.

BACKGROUND

Generally, an IC card used as a portable electronic device is provided with a card shaped main body formed of plastic or the like, and an IC module embedded in the main body. The IC module has an IC (Integrated Circuit) chip. The IC chip has a nonvolatile memory which can hold data in the state without power source, such as an EEPROM (Electrically Erasable Programmable Read-Only Memory) and a flash ROM (Read Only Memory), a CPU (Central Processing Unit) to execute various operations, and a RAM (Random Access Memory) used for the processing of the CPU, and so on.

An IC card can perform transmission of data and reception of data by contactless communication. The IC card to perform contactless communication is provided with an IC chip and an antenna. The IC card receives magnetic field outputted from a reader/writer of an IC card processing device which processes the IC card through the antenna within the IC card, and operates by electric power induced by electromagnetic induction. In addition, when the IC card receives a command from the IC card processing device by contactless communication, the IC card executes an application in accordance with the received command. By this means, the IC card can realize various functions.

Conventionally, an IC card processing device performs as an active device which transmits a command to an IC card. In addition, the IC card performs as a passive device which performs processing in accordance with the received command. But, recently, an IC card which performs as an active device has been desired.

But, when other IC card further exists within a communicable range of the IC card, the IC card which has switched to an active device requires to perform collision avoiding processing (anticollision) and initial setting so as to detect the IC card within the communicable range. For the reason, there is a problem that the processing time increases.

DETAILED DESCRIPTION

An IC card according to an embodiment is an IC card which performs contactless communication with an external device, and is provided with a receiver to receive a first command transmitted from the external device, a determining processor to determine whether or not the first command is a switching request command to request switching a mode of the IC card from a passive mode to an active mode, a switching processor to switch the mode of the IC card from the passive mode to the active mode, when the first command is the switching request command, an identification information acquiring processor to acquire identification information of other IC card existing in a communicable range of the external device from the switching request command, a command generating processor to generate a second command including the identification information acquired by the identification information acquiring processor so as to make the other IC card execute processing, and a command transmitter to transmit the second command to the other IC card.

By this means, an IC card and a portable electronic device of the present embodiment can smoothly switch an own mode from a passive mode to an active mode, and the IC card and the portable electronic device are provided with higher convenience. In addition a reader/writer can smoothly switch modes of an IC card and a portable electronic device from a passive mode to an active mode.

Hereinafter, an IC card, a portable electronic device, and a reader/writer according to an embodiment will be described in detail with reference to the drawings. In the embodiment, an IC card is used as a portable electronic device, and an IC card is used as a reader/writer.

Figure 1:
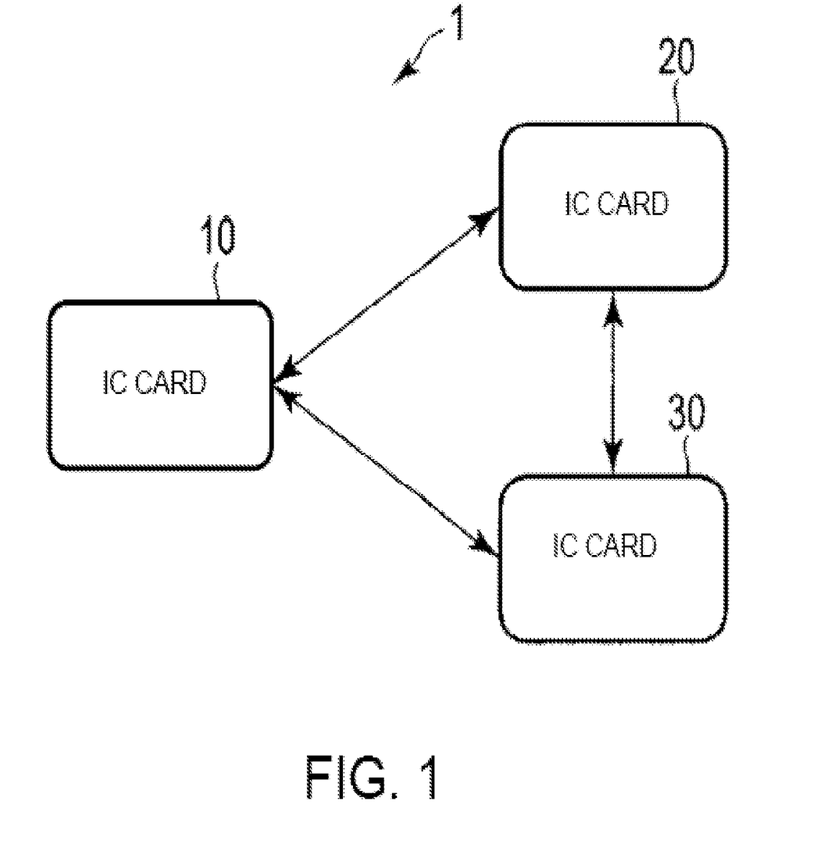
FIG. 1 is a diagram describing an IC card processing system according to an embodiment.

FIG. 1 shows a configuration example of an IC card processing system 1 according to the embodiment. The IC card processing system 1 is provided with an IC card 10, an IC card 20, and an IC card 30.

Portable electronic devices according to the present embodiment are the IC cards 10, 20 and 30, and each of the IC cards 10, 20 and 30 is provided with a contactless communication function. By this means, the IC card 10, the IC card 20, and the IC card 30 can transmit data and receive data with each other by contactless communication. The IC card 10, the IC card 20 and the IC card 30 are provided with the similar configuration. In addition, assuming that the IC card 10 performs as an active device, and the IC cards 20 and 30 function as a passive device, in an initial state, the IC card 10, the IC card 20 and the IC card 30 will be described.

The IC card 10 performs as a reader/writer which transmits a command to the IC card 20 or the IC card 30, and receives a response to the command from the IC card 20 or the IC card 30. Each of the IC card 20 and the IC card 30 executes processing in accordance with a command transmitted from the IC card 10, and transmits a response to the command to the IC card 10.

In addition, each of the IC card 20 and the IC card 30 is provided with a function of an active device to transmit a command to other IC card in the same manner as the IC card 10. In addition, the IC card 10 is provided with also a function of a passive device to execute processing based on a command transmitted from other IC card, in the same manner as the IC card 20 and the IC card 30.

Figure 2:
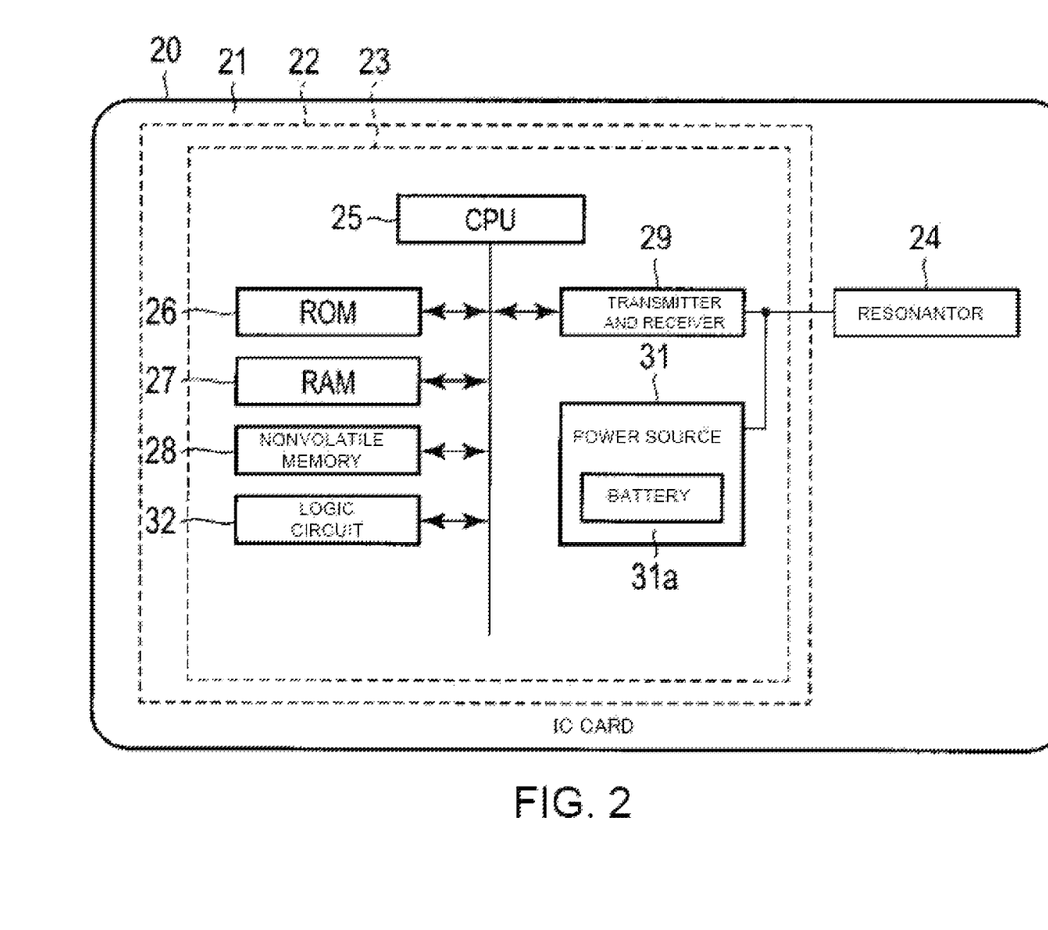
FIG. 2 is a diagram describing a configuration example of an IC card according to the embodiment.

FIG. 2 shows a configuration example of the IC card 20 according to the embodiment. In addition, the IC card 20 will be described here, but the IC card 10 and the IC card 30 have the same configuration as the IC card 20.

As shown in FIG. 2, the IC card 20 is provided with a rectangular main body 21, an IC module 22 and a resonator (antenna resonance circuit) 24 which are incorporated in the main body 21. The IC module 22 is provided with an IC chip 23. When the IC module 22 is installed in the main body 21, the IC chip 23 of the IC module 22 is connected with the resonator 24 installed in the main body 21.

In addition, without being limited to a rectangular shape, the main body 21 may be of any shape in which at least the resonator 24 and the IC module 22 can be installed.

The IC chip 23 is provided with a CPU 25, a ROM 26, a RAM 27, a nonvolatile memory 28, a transmitter and receiver 29, a power source 31 and a logic circuit 32, and so on. The CPU 25, the ROM 26, the RAM 27, the nonvolatile memory 28, the transmitter and receiver 29 and the logic circuit 32 are connected to each other through a bus.

The resonator 24 is an interface for communicating with an external device such as other IC card. The resonator 24 is provided with an antenna composed of a metal wire having a prescribed shape arranged in the IC module 22, for example. The resonator 24 is connected to the transmitter and receiver 29 and the power source 31 of the IC chip 23.

IC card 20 makes the antenna generate magnetic field in accordance with data to be transmitted to an external device. By this means, the IC card 20 can transmit the data to the external device. In addition, the IC card 20 recognizes data transmitted from the external device based on an induced current generated in the antenna by electromagnetic induction. By this means, the IC card 20 can receive the data transmitted from the external device.

The CPU 25 functions as a controller to administer the whole control of the IC card 20. The CPU 25 performs various processings based on a control program and control data that are stored in the ROM 26 or the nonvolatile memory 28. For example, the CPU 25 executes various processings in response to the command received from the external device, and generates data based on the processing result. In addition, the CPU 25 can generate a command which makes the external device execute processing.

The ROM 26 is a nonvolatile memory to previously store a control program and control data and so on. The ROM 26 is incorporated in the IC chip 23 in the manufacturing stage, in the state in which the control program and the control data are stored. That is, the control program and the control data in accordance with the specification of the IC card 20 are previously installed in the ROM 26.

The RAM 27 is a volatile memory which performs as a working memory. The RAM 27 temporarily stores data or the like which is being processed in the CPU 25. For example, the RAM 27 temporarily stores data received through the resonator 24. In addition, the RAM 27 temporarily stores data to be transmitted to the external device through the resonator 24. In addition, the RAM 27 further temporarily stores a program which the CPU 25 executes.

The nonvolatile memory 28 is provided with an EEPROM which can write and rewrite data, such as a flash memory. The nonvolatile memory 28 stores a control program, control data, an application, personal information, security information, and data used for the application. The security information is a cipher key, for example.

The transmitter and receiver 29 performs signal processing such as encoding, and load modulation, to the data to be transmitted to the external device. For example, the transmitter and receiver 29 performs modulation (amplification) of the data to be transmitted to the external device. The transmitter and receiver 29 transmits the data after signal processing to the resonator 24.

In addition, the transmitter and receiver 29 performs demodulation and decoding to a signal received by the resonator 24. For example, the transmitter and receiver 29 analyzes the signal received by the resonator 24. By this means, the transmitter and receiver 29 acquires binary logic data. The transmitter and receiver 29 transmits the analyzed data to the CPU 25 thorough the bus.

The power source 31 generates power based on electric wave, especially a carrier wave, outputted from an IC card processing device to process an IC card, or other IC card, or the like. That is, the power source 31 can generate power by electromagnetic induction based on the carrier wave in space received by the resonator 24. In addition, the power source 31 generates an operation clock. The power source 31 supplies the generated power and operation clock to the respective parts of the IC card 20. When having received the supply of power, each of the parts of the IC card 20 becomes in an operable state.

In addition, the power source 31 is provided with a battery 31*a*. The battery 31*a* is provided with a battery to extract electric energy by chemical reaction or physical reaction of substances, for example. In addition, the battery 31*a* may be provided with a capacitor or a rechargeable battery which stores the supplied electric power.

For example, the power source 31 can generate electric power based on the carrier wave outputted in space, and can charge the generated electric power to the battery 31*a*. In addition, the power source 31 can supply the electric power which is charged in the battery 31*a* to the resonator 24. By this means, the IC card 20 can output the carrier wave from the resonator 24 into space using the electric power charged in the battery 31*a*. By this means, the IC card 20 can supply electric power to other IC card in space (the IC card 10 or the IC card 30, for example).

The logic circuit 32 is a calculator to perform calculation processing by means of hardware. For example, the logic circuit 32 performs processing, such as encoding, decoding and generation of a random number, based on a command from an external device. For example, when the IC card 20 receives a mutual authentication command, the logic circuit 32 generates a random number, and transmits the random number generated to the CPU 25.

When the IC card 20 is in a passive mode, the CPU 25 can execute processing (command processing) corresponding to a command received by the transmitter and receiver 29. According to the command received by the transmitter and receiver 29, the CPU 25 can execute processing in accordance with various commands prescribed by ISO/IEC7816, such as reading and writing, for example.

In addition, when the IC card 20 is in an active mode, the CPU 25 can transmit a command to an external device, such as the IC card 10 or the IC card 30 by the transmitter and receiver 29. In addition, the CPU 25 analyzes a response transmitted from the external device, such as the IC card 10 or the IC card 30, and can recognize the processing result in the external device, such as the IC card 10 or the IC card 30.

The IC card 20 is issued through a primary issue and a secondary issue. In the primary issue, the IC card 20 creates files for storing various data in the nonvolatile memory 28 in accordance with commands. By this means, a Master File (MF), a Dedicated File (DF), and an Elementary File (EF) and so on are created in the nonvolatile memory 28.

The MF is a file which constitutes a core of the file structure. The DF is created at a lower level of the MF in a hierarchical structure. The DF is a file to store applets and components which the applets have, and so on, by grouping them. The EF is created at a lower level of the DF. The EF is a file for storing various data. In addition, there is also a case in which the EF is positioned immediately below the MF.

There are kinds such as a Working Elementary File (WEF) and an Internal Elementary File (IEF) in the EF. The WEF is a working EF, and stores personal information and so on. The IEF is an internal EF, and stores data such as, a cipher key (personal identification number) and so on, for security.

In the secondary issue, in the IC card 20, individual data such as customer data is stored in the EF, for example. By this means, the IC card 20 becomes in an operable state. The CPU 25 executes the program stored in the nonvolatile memory 28 or the ROM 26, and thereby can realize various processings.

Figure 7:
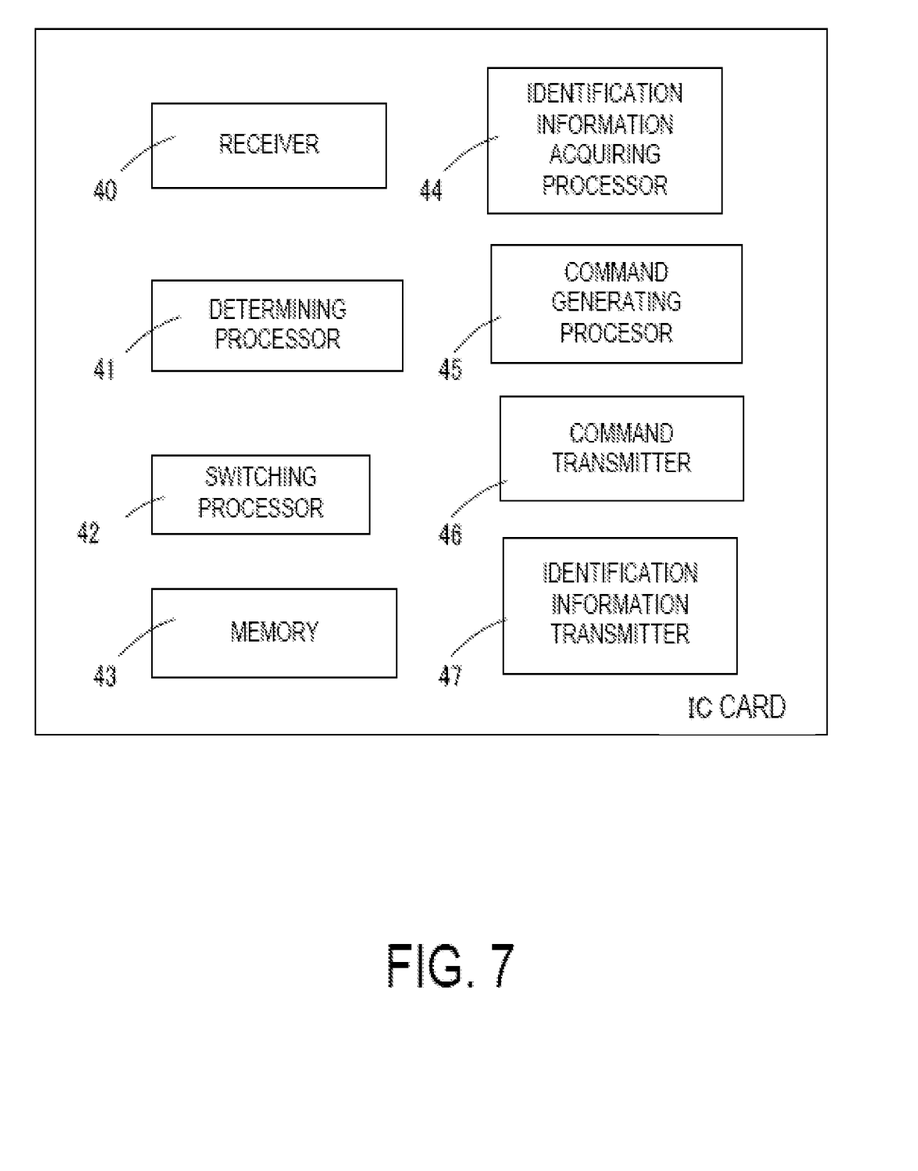
FIG. 7 is a diagram describing a functional configuration of the IC card according to the embodiment.

As shown in FIG. 7, each of the IC cards 10, 20, 30 has, as its functional configuration, a receiver 40, a determining processor 41, a switching processor 42, a memory 43, an identification information acquiring processor 44, a command generating processor 45, a command transmitter 46 and an identification information transmitter 47.

The receiver 40 receives a first command transmitted from an external device.

The determining processor 41 determines whether or not the first command is a switching request command to request switching from a passive mode to an active mode.

The switching processor 42 switches oneself from a passive mode to an active mode when the first command is the switching request command.

The identification information acquiring processor 44 acquires identification information of other IC card existing in a communicable range of the external device from the switching request command.

The command generating processor 45 generates a second command including the identification information acquired by the identification information acquiring processor 44 so as to make the other IC card execute processing.

The command transmitter 46 transmits the second command to the other IC card.

The memory 43 stores the identification information.

The identification information transmitter 47 transmits the identification information stored in the memory 43 to the external device when oneself is switched from the passive mode to the active mode by the switching processor 42.

Figure 8:
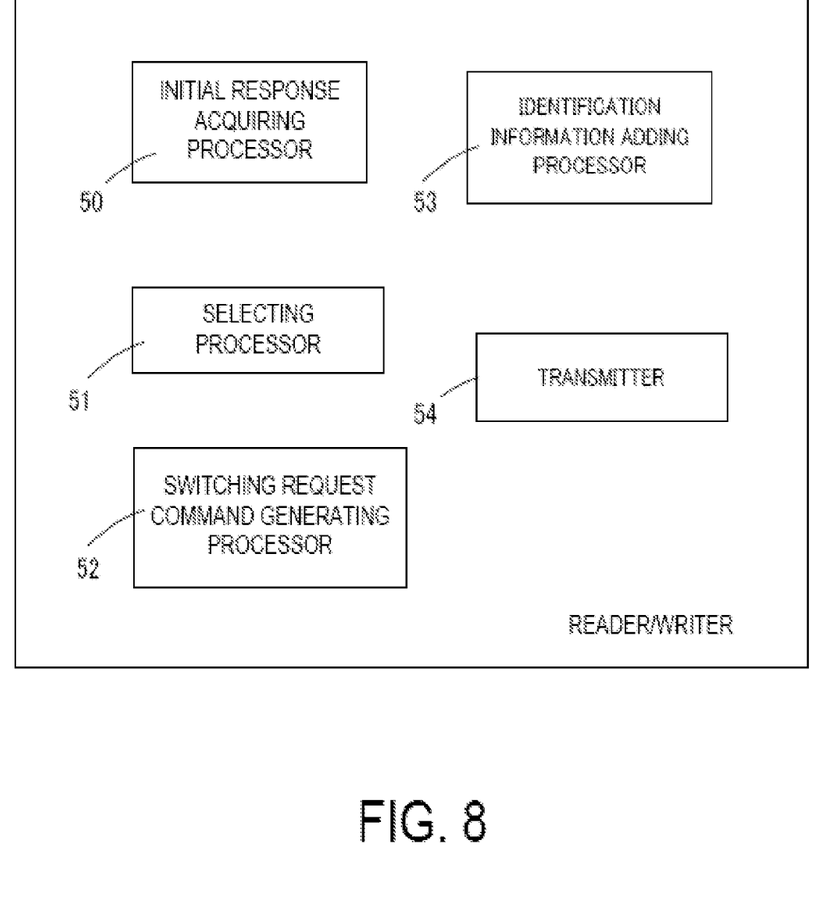
FIG. 8 is a diagram describing another functional configuration of the IC card according to the embodiment.

In addition, each of the IC cards 10, 20, 30 which performs as a reader/writer has, as is functional configuration, an initial response acquiring processor 50, a selecting processor 51, a switching request command generating processor 52, an identification information adding processor 53, and a transmitter 54.

The initial response acquiring processor 50 transmits an initial response request command, and receives initial responses including identification information of IC cards from a plurality of the IC cards within the communicable range, respectively.

The selecting processor 51 selects an IC card within the communicable range using the initial response.

The switching request command generating processor 52 generates a switching request command to request switching the IC card selected by the selecting processor 51 from the passive mode to the active mode.

The identification information adding processor 53 adds the identification information of the IC card within the communicable range to the switching request command.

The transmitter 54 transmits the switching request command including the identification information of the IC card within the communicable range to the IC card selected by the selecting processor 51.

The IC card of the active mode can make the other IC card of the passive mode execute command processing. Here, an example in which the IC card 10 is in an active mode, and the IC card 20 and the IC card 30 are in passive mode will be described.

Figure 3:
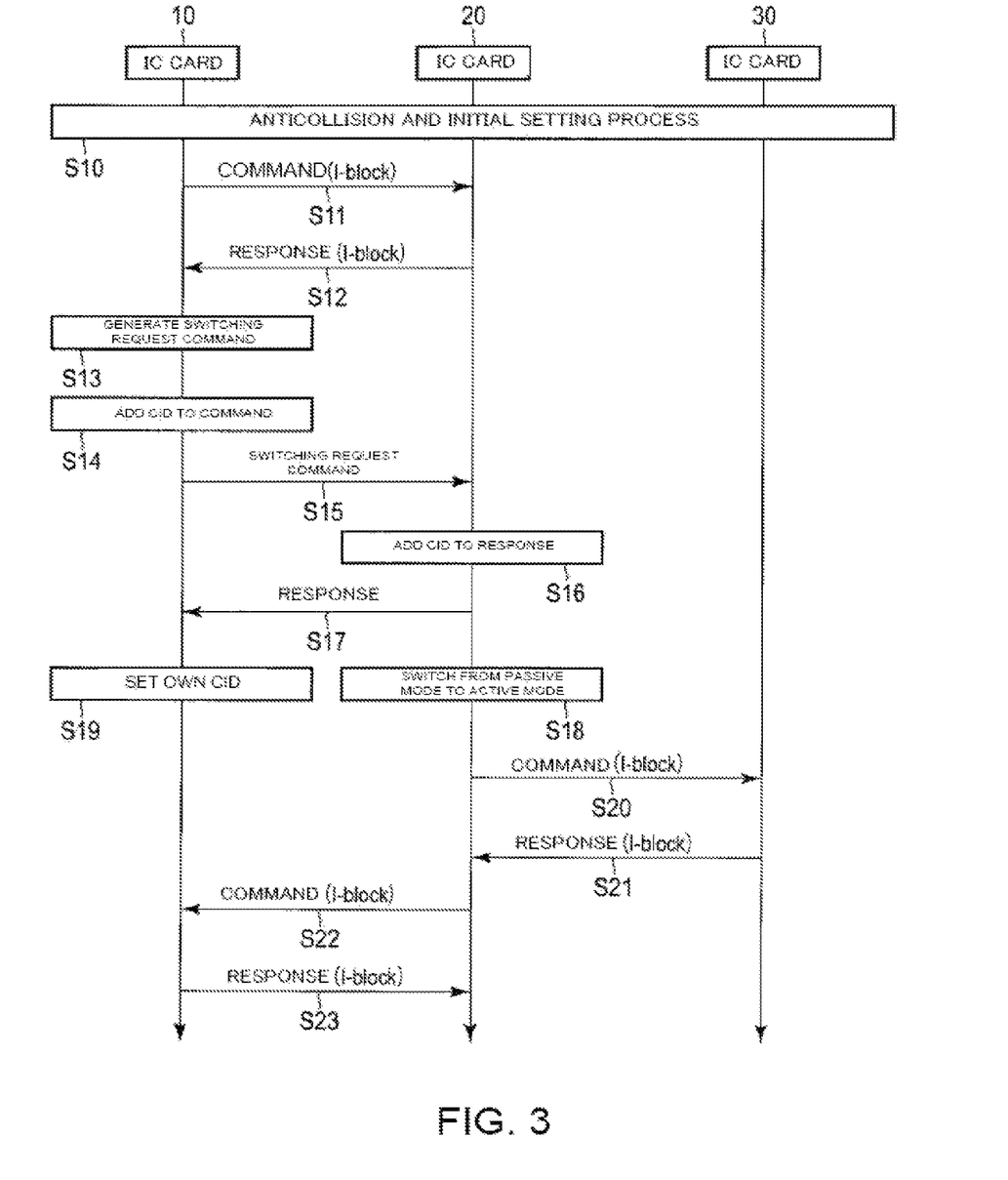
FIG. 3 is a diagram describing switching processing of the IC card according to the embodiment.

FIG. 3 shows an example of the processings of the IC card 10, the IC card 20 and the IC card 30. In addition, in the present embodiment, the IC card 10, the IC card 20 and the IC card 30 perform contactless communication by the block format prescribed by ISO/IEC14443. FIG. 3 describes switching processing in which the IC card 10 changes from the active mode to the passive mode, and the IC card 20 changes from the active mode to the passive mode.

To begin with, anticollision and initial setting processing performed first in the processing will be described (step S10).

The IC card 10 that is in the active mode transmits an initial response request command to the IC card 20 and the IC card 30. The initial response request command has a parameter indicating that the command is an initial response request command, a parameter for specifying the application field, a parameter indicating attribute information such as the kind of the command and a method of anticollision, a parameter indicating the number of slots of the anticollision, and a cyclic redundancy check code, for example.

The IC card 10 repeatedly transmits the generated initial response request command to a communicable range in space by the resonator 24. In addition, the IC card 10 supplies carrier wave to the communicable range.

When the IC card 20 and the IC card 30 enter into the communicable range of the IC card 10, they are activated by the carrier wave from the IC card 10 and become in an idle state. That is, the IC card 10 supplies the carrier wave to the IC card 20 and the IC card 30 within the communicable range. In addition, the IC card 20 and the IC card 30 receive the initial response request command.

The IC card 20 and the IC card 30 analyze the received initial response request command. By this means, the IC card 20 and the IC card 30 respectively recognize the values of various parameters of the initial response request command. The IC card 20 and the IC card 30 respectively execute the processing based on the values of the recognized parameters. The IC card 20 and the IC card 30 generate initial responses as responses to the initial response request command in accordance with the processing results, respectively.

The initial response includes a parameter indicating that the response is a response to the initial response request command, a pseudo peculiar IC card identifier, application data, protocol information, and a cyclic redundancy check code. The application data indicates what applications are written in the IC card 20 and the IC card 30. The protocol information indicates the protocol which the IC card 20 and the IC card 30 support.

Having received the initial response request command, the IC card 20 and the IC card 30 generate initial responses including the information as described above. In addition, the protocol information includes information (communication speed information) indicating communication speed which the IC card 20 and the IC card 30 support. Furthermore, the protocol information includes a maximum frame length, a protocol type, a frame waiting time coefficient, application data encoding and a frame option, and so on.

The maximum frame length indicates a maximum frame length which the IC card 20 and the IC card 30 can receive. The protocol type indicates a protocol type which the IC card 20 and the IC card 30 support. The frame waiting time coefficient indicates a maximum time from the last of the command (a frame including the command) transmitted from the IC card 20 and the IC card 30 to a time when the IC card 20 and the IC card 30 start the response. The application data encoding indicates a type of the encoding which the IC card 20 and the IC card 30 support. The frame option indicates whether the IC card 20 and the IC card 30 support a node address (NAD), or a card identifier (CID).

The IC card 20 and the IC card 30 transmit the generated initial responses to the initial response request command to the IC card 10. In addition, the IC card 20 and the IC card 30 transmit the initial responses to the IC card 10 in either slot out of a plurality of the slots presented by the initial response request command.

Having received the initial response request command, each of the IC card 20 and the IC card 30 transmit the response having the own CID to the IC card 10, so that the initial response does not collide with the initial response from the other IC card. By this means, the IC card 10 can acquire the CID of each IC card included in the initial response.

Having received the initial response to the initial response request command, the IC card 10 analyzes the received response. By this means, the IC card 10 recognizes that the IC card 20 and the IC card 30 exist in the own communicable range. The IC card 10 selects an IC card to be processed. In addition, here, it is assumed that the IC card 20 is selected as an object to be processed.

In addition, the IC card 10 confirms the communication speed information included in the initial response, and recognizes the communication speed which is supported by the IC card 20. In addition, the IC card 10 generates a selection command having information indicating a communication speed which is set by the IC card 20, and identification information for identifying the IC card 20. The identification information is a card identifier (CID), for example. The IC card 10 transmits the selection command to the IC card 20.

Having received the selection command, the IC card 20 analyzes the election command. By this means, the IC card 20 recognizes the communication speed and the identification information which are designated by the IC card 10 and included in the selection command.

The IC card 20 compares the recognized identification information and the identification information which oneself has. When they coincide with each other, the IC card 20 performs the subsequent processing. In this case, the IC card 20 sets the communication speed designated by the selection command to the oneself. Specifically, the IC card 20 stores communication speed setting information indicating the communication speed designated by the selection command in a prescribed memory area on the RAM 27 or the nonvolatile memory 28, to thereby set the communication speed. The IC card 20 performs the reception of the command and the transmission of the response in accordance with the communication speed indicated by the communication speed setting information stored in the RAM 27 or the nonvolatile memory 28.

In addition, when the acquired identification information does not coincide with the identification information which oneself has, the IC card 20 finishes the processing.

When the setting of the communication speed has been finished, the IC card 20 generates a response to the selection command, and transmits the generated response to the IC card 10. In addition, in this case, the IC card 20 transmits the response in a state in which the IC card 10 can analyze at a standard communication speed to the IC card 10. After having transmitted the response to the selection command, the IC card 20 receives a new command, and transmits a response to the command, in accordance with the communication speed set by the above-described processing.

When the IC card 10 receives the response to the selection command, the IC card 10 analyzes the response, to thereby recognize that the selection of the IC card 20 has normally been completed. After this, the IC card 10 transmits the command and receives the response at the communication speed set in the IC card 20.

By the above-described processing, a communication channel is established between the IC card 10 and the IC card 20. After this, the IC card 20 can execute various command processings based on a command transmitted from the IC card 10.

Next, the IC card 10 transmits a command to make the IC card 20 execute the processing (step S11). Having received the command, the IC card 20 analyzes the received command. The IC card 20 executes the command processing based on the analyzed command, and generates a response. The IC card 20 transmits the generated response to the IC card 10 (step S12).

In addition, the IC card 10 and the IC card 20 perform command/response by transmitting and receiving a frame of a prescribed format. Hereinafter, the command and response which are transmitted and received between the IC card 10 and the IC card 20 will be described.

The IC card 10 and the IC card 20 transmit and receive data of a frame in accordance with the communication format prescribed by ISO/IEC14443. For example, in ISO/IEC14443, as a frame format, block transmission systems, such as an I-block (Information block), an R-block (Receive ready block), an S-block (Supervisory block) are prescribed.

The I-block, R-block, and S-block have different roles, respectively. The I-block is a format for transmitting information used in an application layer. The I-block is used for usual reading data and writing data.

The R-block is a format for transmitting an acknowledgement or a negative acknowledgement. There are kinds such as an R-block (ACK) and an R-block (NAC) in the R-block. The R-block (ACK) is used when a next command is requested. In addition, the R-block (NAK) is used when retransmission of the received command is requested.

The S-block is a format so as to exchange control information between the IC card 20 and the IC card 30. The S-block is used as an extension request of a processing time, an instruction (Deselect) to make an IC card to be deactivated.

Figure 4:
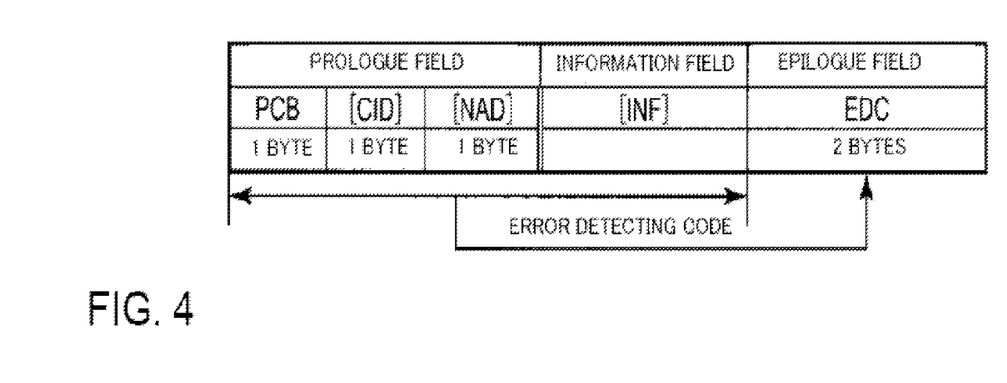
FIG. 4 is a diagram describing a block format of an example.

FIG. 4 shows an example of a block format. A frame conforming to the block format prescribed by ISO/IEC14443 has fields such as a prologue field, an information field, and an epilogue field, and so on. All of the I-block, the R-block, and the S-block conform to the block format shown in FIG. 4.

The prologue field has data such as a Protocol Control Byte (PCB), a Card IDentifier (CID), and a Node Address (NAD).

The PCB that is a protocol control byte can transmit information necessary for data transmission control to a device of the other party (external device). For example, the PCB has information indicating whether this frame is the I-block, the R-block, or the S-block.

The CID that is a card identifier is data so as to designate an IC card to be processed. Each of the IC cards 10 and 20 stores a CID thereof in the RAM 27 or the nonvolatile memory 28. The IC card 10 that is in an active mode acquires the CID from the IC card 20 in the initial setting. The IC card 10 sets the CID of the IC card 20 to be processed in the CID of the prologue field.

When the IC card 20 receives a command, when the value of the CID of the prologue field coincides with the value of the own CID, the IC card 20 executes the processing corresponding to the received command.

The NAD that is a node address is data for constructing different logical connection.

The information field is provided with Information (INF) having a data body of a command, application data, or status information, for example. The IC card 20 executes various processings in accordance with the data stored in the information field. In addition, the information field may be omitted.

The epilogue field is provided with an error detecting code, such as a CRC (Cyclic Redundancy Check), so as to make the IC card 20 at a receiving side detect a communication error. The error detecting code is a value which is calculated based on the data of the epilogue field and the information field. The device that is in the passive mode can detect a communication error based on the data in the epilogue field and the information field, and the error detecting code.

After having established the communication channel with the IC card 20 by the step S10, the IC card 10 that is in the active mode generates a command, and transmits the command to make the IC card 20 execute the processing to the IC card 20 by the step S11. In addition, the IC card 10 transmits the command of the I-block to the IC card 20.

Having received the command, the IC card 20 analyzes the received command. The IC card 20 executes the command processing based on the analyzed command, and generates a response. The IC card 20 transmits the generated response to the IC card 10 by the step S12. In addition, the IC card 20 transmits the response of the I-block to the IC card 10.

Next, the IC card 10 that is in the active mode generates a switching request command to request switching between the active mode and the passive mode to the IC card that is in the passive mode (step S13). In addition, the IC card 10 adds the CID of other IC card within the communicable range which has been acquired in the initial setting to the switching request command (step S14). The IC card 10 transmits the switching request command generated by the step S14 to the IC card 20 (step S15).

Here, the switching request command which is generated by the step S13 and the step S14 will be described. The IC card 10 transmits the switching request command to the IC card 20 under a prescribed condition. For example, when the IC card 10 or the IC card 20 judges that switching between the active mode and the passive mode is necessary on the processing in the IC card 20, the IC card 10 transmits the switching request command to the IC card 20. In addition, when the IC card 10 transmits the previously set command to the IC card 20, the IC card 10 next transmits the switching request command to the IC card 20. The IC card 10 transmits the switching request command in either block format of the I-block or the S-block to the IC card 20.

For example, the IC card 10 generates the switching request command which requests switching between the active mode and the passive mode to the IC card 20 that is in the passive mode by the I-block format.

The frame of the I-block is provided with a prologue field, an information field, and an epilogue field. The switching request command of the I-block is added to the information field of a command of a normal format. That is, in this case, it is indicated that the command is a switching request command by a class byte (CLA) and an instruction byte (INS) of the command added to the information field.

In addition, the IC card 10 adds identification information of the other IC card within the communicable range which has been acquired in the initial setting to the switching request command. The identification information is a card identifier (CID), for example. For example, the IC card 10 adds the CID acquired from the IC card 30 in the initial setting to the switching request command in the information field of the I-block. The IC card 10 transmits the switching request command including the CID of the other IC card within the communicable range to the IC card 20. By this means, the IC card 10 can make the IC card 20 which is to be switched to the active mode recognize the CID of the other IC card within the communicable range.

For example, when one IC card 30 exists in addition to the IC card 20 selected by the IC card 10 within the communicable range of the IC card 10, the IC card 10 adds the CID of the IC card 30 that is not selected to the lower 4 bits of the information field. In addition, when two IC cards exist in addition to the IC card 20 selected by the IC card 10 within the communicable range of the IC card 10, the IC card 10 adds the CIDs of a plurality of the IC cards that are not selected to the lower 8 bits of the information field. Similarly, when IC cards that are not selected further exist, the IC card 10 can add CIDs of a plurality of the IC cards that are not selected to the information field.

Figure 5:
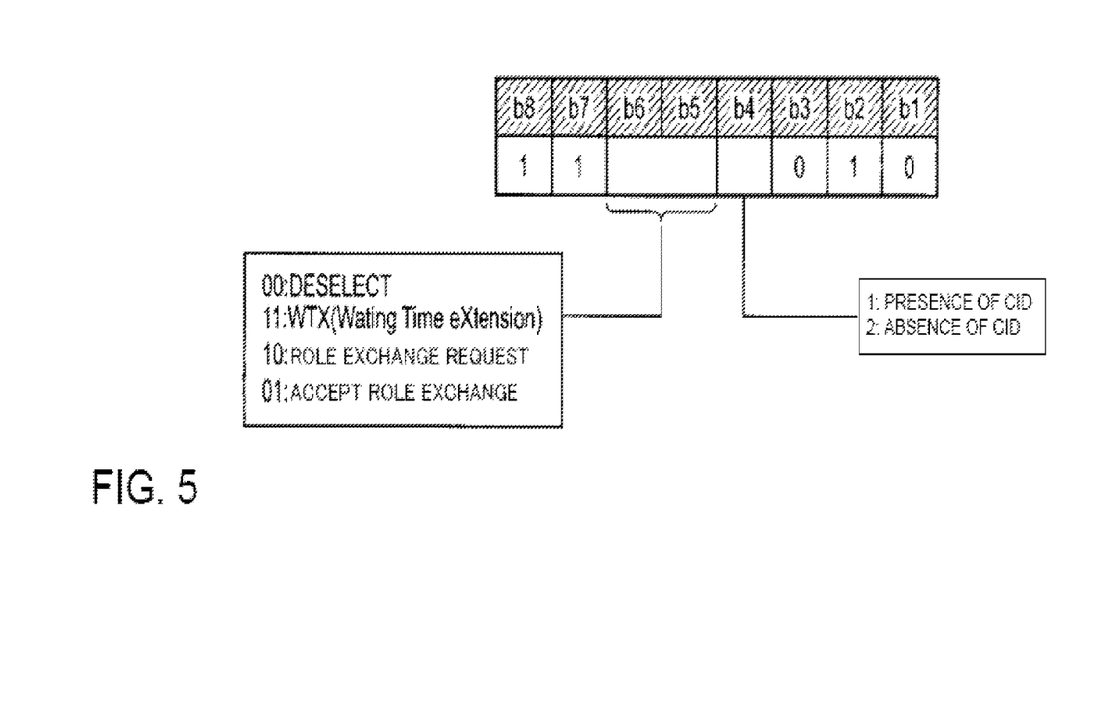
FIG. 5 is a diagram describing a protocol control byte of a switching request command of an S-block according to the embodiment.

FIG. 5 shows an example of a PCB of a switching request command of the S-block. In addition, the PCB is a protocol control byte. In addition, a frame of the S-block is provided with the block format shown in FIG. 4, and is provided with a prologue field, an information field, and an epilogue field.

The PCB of the switching request command of the S-block is data of one byte, and has a first bit b1 to an eighth bit b8.

The second bit b2 and the third bit b3 are prescribed values. The fourth bit b4 indicates the presence or absence of the CID.

The fifth bit b5 and the sixth bit b6 show whether this command is a WTX (Waiting Time eXtension), or an instruction (Deselect) so as to make the IC card 20 to be deactivated. In addition, the fifth bit b5 and the sixth bit b6 indicate the presence or absence of the switching request. That is, when the fifth bit b5 and the sixth bit b6 are "00," it is indicated that the frame including this PCB is a Deselect. In addition, when the fifth bit b5 and the sixth bit b6 are "11," it is indicated that the frame including this PCB is a WTX. In addition, when the fifth bit b5 and the sixth bit b6 are "10," it is indicated that the frame including this PCB is a switching request (role exchange request). In addition, when the fifth bit b5 and the sixth bit b6 are "01," it is indicated that the frame including this PCB has accepted the switching request (role exchange request).

The seventh bit b7 and the eighth bit b8 indicate that the frame including this PCB is either of the I-block, the R-block, or the S-block. For example, when the eighth bit b8 is "1," and the seventh bit b7 is "1," it is indicated that the frame including this PCB is the S-block.

That is, when the IC card 10 instructs switching the role of the active device and the passive device to the IC card 20, the IC card 10 sets the fifth bit b5 and the sixth bit b6 of the PCB to "10," and sets the seventh bit b7 and the eighth bit b8 to "11." The IC card 10 transmits the switching request command which has been set in this manner to the IC card 20.

In this case too, the IC card 10 adds the CID of the IC card within the communicable range which has been acquired in the initial setting to the switching request command. For example, the IC card 10 adds the CID which has been acquired from the IC card 30 in the initial setting into the information field of the S-block. The IC card 10 transmits the switching request command including the CID of the other card within the communicable range to the IC card 20. By this means, the IC card 10 can make the IC card 20 that is to be switched to the active mode recognize the CID of the other IC card within the communicable range.

The IC card 20 receives the above-described switching request command transmitted by the step S15. Having received the command, the IC card 20 analyzes the PCB of the received command. In addition, when the command is the I-block, the IC card 20 analyzes the information field, to thereby acquire the switching request command. In addition, the IC card 20 can acquire the CID of the other IC card (the IC card 30, for example) within the communicable range of the IC card 10, which has been added into the switching request command.

In addition, when the command is the S-block, the IC card 20 analyzes the PCB, to thereby recognize that the received command is the switching request command. In addition, the IC card 20 analyzes the information field, and thereby can acquire the CID of the other IC card (the IC card 30, for example) within the communicable range of the IC card 10.

The IC card 20 generates a response to the switching request command. When the command is the I-block, the IC card 20 generates a response of the I-block. In addition, when the command is the S-block, the IC card 20 generates a response of the S-block. In addition, the IC card 20 adds the own CID to the response (step S16). For example, the IC card 20 adds the own CID to the information field of the response. The IC card 20 transmits the response to the switching request command to the IC card 10 (step S17).

When the IC card 20 has received the switching request command from the IC card 10, the IC card 20 switches the own mode from the passive mode to the active mode (step S18.) The IC card 20 which has switched to the active mode can transmit a command to the IC card 10 or the IC card 30. In addition, since the IC card 20 performs as the active device after this, the IC card 20 deletes the own CID.

In addition, when the IC card 10 receives the response to the switching request command from the IC card 20, the IC card 10 analyzes the received response. The IC card 10 analyzes the information field of the response, to thereby recognize the CID of the IC card 20 that is to be switched to the active mode. In addition, the IC card 10 sets the recognized CID as the own CID (step S19), and switches from the active mode to the passive mode.

For example, it is assumed that the CID of the IC card 10 is absent, the CID of the IC card 20 is "1," and the CID of the IC card 30 is "2" in the initial state. The IC card 20 can recognize that the IC card whose CID is "2" exists within the communicable range, from the switching request command received from the IC card 10. In addition, when the IC card 20 has switched to the active mode, the IC card 20 deletes the own CID "1." In addition, when the IC card 10 switches to the passive mode, the IC card 10 sets, as the own CID, the CID "1" that has been added to the response received from the IC card 20.

When the role exchange between the IC card 10 and the IC card 20 is completed in this manner, the CID of the IC card 10 becomes "1," the CID of the IC card 20 becomes absent, and the CID of the IC card 30 becomes "2."

In this case, the IC card 20 designates the CID, and thereby can make the IC card 10 or the IC card 30 execute the command processing.

For example, when the IC card 20 makes the IC card 30 execute the command processing, the IC card 20 generates a command designating the CID "2," and transmits the command to the IC card 30 (step S20). The IC card 30 compares the CID designated in the received command with the own CID, and executes the command processing when they coincide. The IC card 30 transmits the result of the command processing to the IC card 20 (step S21).

In addition, for example, when the IC card 20 makes the IC card 10 execute the command processing, the IC card 20 generates a command designating the CID "1" and transmits the command to the IC card 10 (step S22). The IC card 10 compares the CID designated in the received command with the own CID, and executes the command processing when they coincide. The IC card 10 transmits the result of the command processing to the IC card 20 (step S23).

In addition, before the IC card 20 transmits a command to the IC card 30 in the step S20, it is sometimes necessary to perform the initial setting between the IC card 20 and the IC card 30. Therefore, the IC card 10 may add the initial response received from the IC card 30 in the initial setting in the step S10, to the switching request command in the step S15.

In this case, the IC card 20 can acquire the initial response transmitted from the IC card 30 existing within the communicable range of the IC card 10, from the switching request command in the step S15. The IC card 20 can perform the initial setting between oneself and the IC card 30 using this initial response.

In addition, the IC card 20 generates a selection command having information indicating communication speed which is made to be set to the IC card 30, and identification information for identifying the IC card 30. The identification information for identifying the IC card 30 is the card identifier (CID) of the IC card 30. The IC card 20 transmits the selection command to the IC card 30.

Having received the selection command, the IC card 30 analyzes the selection command. By this means, the IC card 30 recognizes the communication speed and the CID that have been included in the selection command and designated by the IC card 20.

The IC card 30 compares the recognized CID with the own CID, and performs subsequent processing when they coincide. In this case, the IC card 30 sets the communication speed designated by the selection command to oneself.

When the setting of the communication speed has been completed, the IC card 30 generates a response to the selection command, and transmits the generated response to the IC card 20.

Having received the response to the selection command, the IC card 20 analyzes the response, and thereby recognizes that the selection of the IC card 30 has normally been completed. By the above-described processing, the communication channel between the IC card 30 and the IC card 20 is established. In this case, the IC card 20 uses the initial response of the IC card 30 transmitted from the IC card 30 to the IC card 10 in the step S10. Accordingly, the IC card 20 can shorten a time required for the initial setting between the IC card 20 and the IC card 30. That is, the IC card 20 that has become the active mode does not require transmission of the initial response request command to the other IC card, and reception of the initial response to the initial response request command from the other IC card.

After this, the IC card 20 and the IC card 30 can transmit and receive a command and a response at the communication speed set to the IC card 30. That is, the IC card 30 executes various command processings based on the command transmitted from the IC card 20.

Figure 6:
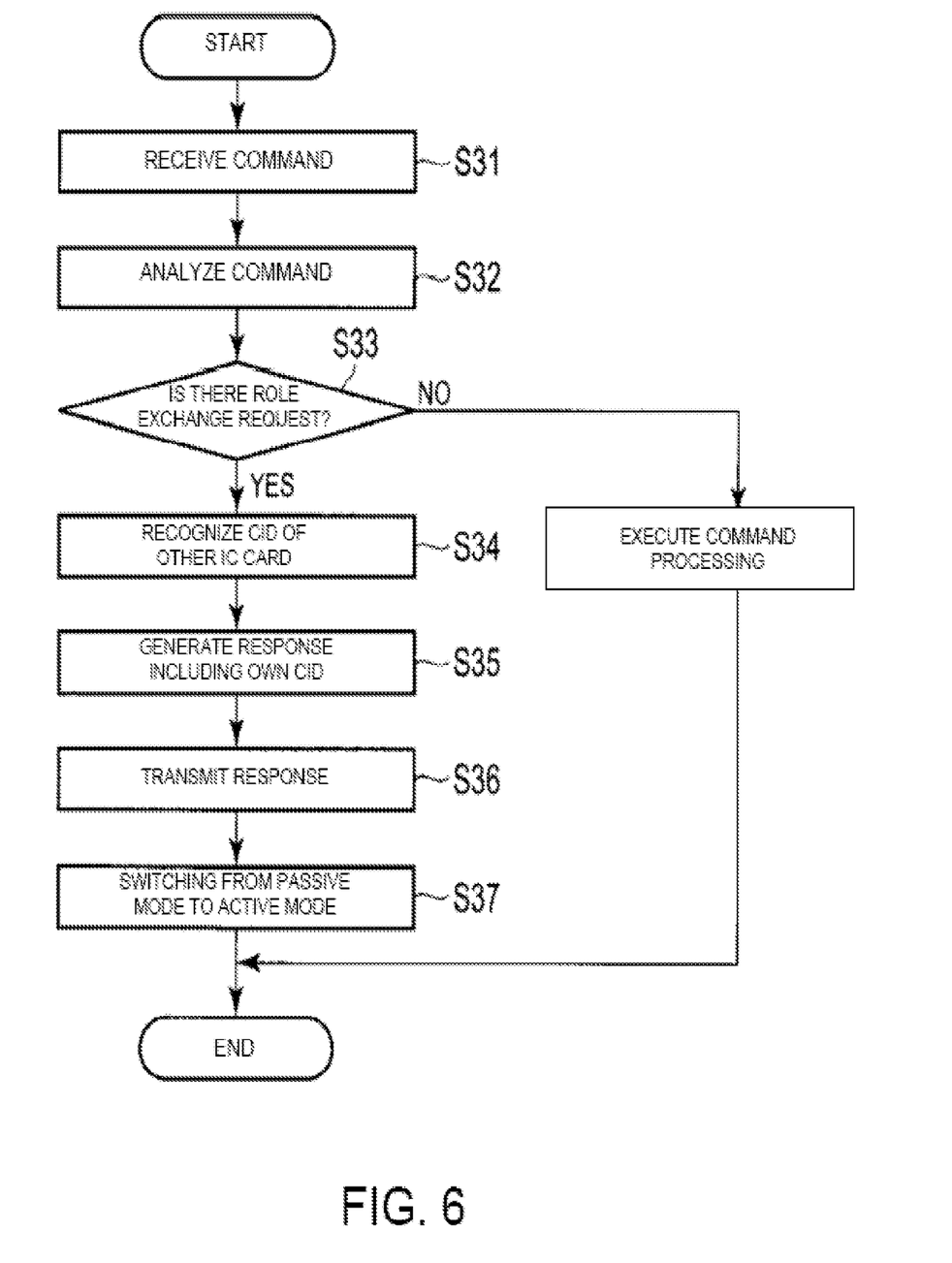
FIG. 6 is a diagram describing a flow showing switching processing of the IC card according to the embodiment.

FIG. 6 shows an example of a flow of processing of the IC card 20 in FIG. 3. The IC card 20 waits for reception of a command from the IC card 10 (step S31). Having received the command, the IC card 20 analyzes the received command (step S32). By this means, the IC card 20 judges whether or not a role exchange request is included in the received command (step S33). That is, the IC card 20 judges whether or not the received command is a switching request command.

When the IC card 20 judges that the received command is the switching request command, the IC card 20 recognizes a CID of other IC card included in the switching request command (step S34). That is, the IC card 20 recognizes the CID of the IC card 30 existing in the communicable range of the IC card 10.

The IC card 20 generates a response to the switching request command. In addition, the IC card 20 adds the own CID to this response. That is, the IC card 20 generates a response including the own CID (step S35). The IC card 20 transmits the generated response to the IC card 10 (step S36). Furthermore, the IC card 20 switches the own mode from the passive mode to the active mode (step S37). In this time, the IC card 20 deletes the own CID. In addition, when the IC card 20 judges in the step S33 that the received command is not the switching request command, the IC card 20 executes the processing in accordance with the command.

By this means, the IC card 20 which has switched from the passive mode to the active mode can recognize the CID of the other IC card existing in the communicable range. By this means, immediately after the IC card 20 has switched from the passive mode to the active mode, the IC card 20 can transmit a command to the other IC card, without performing the initial setting with the other IC card. In addition, even in the case in which setting of the communication speed is required, the IC card 20 can receive the switching request command including the initial response of the other IC card. For this reason, the IC card 20 can shorten the time required for the initial setting to the other IC card.

By this means, the IC card 20 can smoothly switch the own mode from the passive mode to the active mode. As a result, according to the present embodiment, it is possible to provide an IC card, a portable electronic device, and a reader/writer of an IC card which are provided with higher convenience.

In addition, without being limited to that the functions described in the above-described embodiments are configured using hardware, the respective functions can be realized using software. That is, the respective functions can be realized by making a computer read program describing the respective functions. In addition, each of the functions may be configured by arbitrarily selecting either of software and hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card which performs contactless communication with an external device, the IC card, comprising:
    a receiver operable to receive a first command transmitted from the external device in a passive mode;
    a determining processor operable to determine whether or not the first command is a switching request command to request switching a mode of the IC card from the passive mode to an active mode;
    a switching processor operable to switch the mode of the IC card from the passive mode to the active mode when the determining processor determines that the first command is the switching request command;
    an identification information acquiring processor operable to acquire identification information of another IC card existing in the communicable range of the external device from the switching request command in the passive mode;
    a command generating processor operable to generate a second command including the identification information acquired by the identification information acquiring processor so as to make the other IC card execute processing in the active mode; and
    a command transmitter operable to transmit the second command to the other IC card in the active mode.

2. The IC card according to claim 1, further comprising:
    a memory operable to store the identification information; and
    an identification information transmitter operable to transmit the identification information stored in the memory to the external device when the mode of the IC card is switched from the passive mode to the active mode by the switching processor.

3. The IC card according to claim 2, wherein the identification information is a card identifier.

4. The IC card according to claim 2, wherein:
    when the mode of the IC card is switched from the passive mode to the active mode by the switching processor, the command generating processor generates a third command including the identification information transmitted by the identification information transmitter so as to make the external device execute the processing; and
    the command transmitter transmits the third command to the external device.

5. The IC card according to claim 1, comprising:
    an IC module having the receiver, the determining processor, the switching processor, the identification information acquiring processor, the command generating processor, and the command transmitter; and
    a main body in which the IC module is arranged.

6. A portable electronic device which performs contactless communication with an external device, the portable electronic device, comprising:
    a receiver operable to receive a first command transmitted from the external device in a passive mode;
    a determining processor operable to determine whether or not the first command is a switching request command to request switching a mode of the portable electronic device from the passive mode to an active mode;

a switching processor operable to switch the mode of the portable electronic device from the passive mode to the active mode when the determining processor determines that the first command is the switching request command;

an identification information acquiring processor operable to acquire identification information of another portable electronic device existing in the communicable range of the external device from the switching request command in the passive mode;

a command generating processor operable to generate a second command including the identification information acquired by the identification information acquiring processor so as to make the other portable electronic device execute processing in the active mode; and a command transmitter operable to transmit the second command to the other portable electronic device in the active mode.

7. A reader/writer of an IC card, comprising:

an initial response acquiring processor operable to transmit an initial response request command, and receive from a plurality of IC cards within a communicable range, initial responses including identification information of the respective IC cards;

a selecting processor operable to select an IC card within the communicable range using the initial responses;

a switching request command generating processor operable to generate a switching request command to request switching a mode of the IC card selected by the selecting processor from the passive mode to an active mode, wherein the IC card transmits a command and receives a response to the command transmitted in the active mode, wherein the IC card receives a command, performs a command processing corresponding to the command received and transmits a response to the command received in the active mode, and wherein the switching request command includes identification information of another IC card existing in a communicable range of the external device;

an identification information adding processor operable to add the identification information of another IC card within the communicable range to the switching request command; and a transmitter operable to transmit the switching request command including the identification information of the other IC card within the communicable range to the IC card selected by the selecting processor.

8. A reader/writer of a portable electronic device, comprising:

an initial response acquiring processor operable to transmit an initial response request command, and receive from a plurality of portable electronic devices within a communicable range, initial responses including identification information of the respective portable electronic devices;

a selecting processor operable to select a portable electronic device within the communicable range using the initial response;

a switching request command generating processor operable to generate a switching request command to request switching a mode of the portable electronic device selected by the selecting processor from the passive mode to an active mode, wherein the portable electronic device transmits a command and receive a response to the command transmitted in the active mode, wherein the portable electronic device receives a command, performs a command processing corresponding to the command received and transmits a response to the command received in the active mode, and wherein the switching request command includes identification information of another portable electronic device existing in a communicable range of the external device;

an identification information adding processor operable to add the identification information of another portable electronic device within the communicable range to the switching request command; and a transmitter operable to transmit the switching request command including the identification information of the other portable electronic device within the communicable range to the portable electronic device selected by the selecting processor.

* * * * *